US 011386816B2

United States Patent
Li et al.

(10) Patent No.: US 11,386,816 B2
(45) Date of Patent: Jul. 12, 2022

(54) FLEXIBLE DISPLAY DEVICE AND APPLICATION METHOD THEREOF

(71) Applicant: BOE TECHNOLOGY GROUP CO., LTD., Beijing (CN)

(72) Inventors: Hong Li, Beijing (CN); Dawei Wang, Beijing (CN); Shanchen Kao, Beijing (CN); Yanli Wang, Beijing (CN); Haoran Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 432 days.

(21) Appl. No.: 16/476,613

(22) PCT Filed: Dec. 14, 2018

(86) PCT No.: PCT/CN2018/121111
§ 371 (c)(1),
(2) Date: Jul. 9, 2019

(87) PCT Pub. No.: WO2019/200949
PCT Pub. Date: Oct. 24, 2019

(65) Prior Publication Data
US 2021/0407327 A1    Dec. 30, 2021

(30) Foreign Application Priority Data

Apr. 19, 2018  (CN) .......................... 201810356492.6

(51) Int. Cl.
*G09F 9/00*       (2006.01)
*G09F 9/30*       (2006.01)
*G06F 1/16*       (2006.01)

(52) U.S. Cl.
CPC ............ *G09F 9/301* (2013.01); *G06F 1/1635* (2013.01); *G06F 1/1652* (2013.01)

(58) Field of Classification Search
CPC ....... G09F 9/301; G06F 1/1635; G06F 1/1652
See application file for complete search history.

(56) References Cited

U.S. PATENT DOCUMENTS 6,498,597 B1 * 12/2002 Sawano .................. G09F 11/29
345/107
9,606,625 B2 * 3/2017 Levesque .............. G06F 1/1652
(Continued)

FOREIGN PATENT DOCUMENTS

CN     201185067 Y    1/2009
CN     102956161 A    3/2013
(Continued)

OTHER PUBLICATIONS

International Search Report of PCT/CN2018/121111 in Chinese, dated Mar. 27, 2019 with English translation.
(Continued)

*Primary Examiner* — Pete T Lee
(74) *Attorney, Agent, or Firm* — Collard & Roe, P.C.

(57) ABSTRACT

A flexible display device and an application method thereof are provided. The flexible display device includes a main body, a flexible display screen and a power device, the flexible display screen is configured to have a first end coupled to the main body, and a second end of the flexible display screen opposite to the first end is movable relative to the main body.

20 Claims, 2 Drawing Sheets

(56) References Cited

U.S. PATENT DOCUMENTS

| | | | |
|---|---|---|---|
| 10,254,795 B2 | 4/2019 | Huitema et al. | |
| 10,278,458 B2 | 5/2019 | Tamiki et al. | |
| 2009/0233265 A1* | 9/2009 | Budryk | A63F 7/3603 |
| | | | 434/412 |
| 2015/0286253 A1* | 10/2015 | Jung | G06F 1/1626 |
| | | | 361/679.3 |
| 2015/0378397 A1 | 12/2015 | Park et al. | |
| 2016/0135284 A1* | 5/2016 | Choi | G09F 9/301 |
| | | | 361/749 |
| 2018/0061893 A1* | 3/2018 | Breedlove | H01L 27/322 |

FOREIGN PATENT DOCUMENTS

| | | |
|---|---|---|
| CN | 202838855 U | 3/2013 |
| CN | 105278627 A | 1/2016 |
| CN | 205263715 U | 5/2016 |
| CN | 105652970 A | 6/2016 |
| CN | 105700841 A | 6/2016 |
| CN | 108335635 A | 7/2018 |

OTHER PUBLICATIONS

Notice of Transmittal of the International Search Report of PCT/CN2018/121111 in Chinese, dated Mar. 27, 2019.
Written Opinion of the International Searching Authority of PCT/CN2018/121111 in Chinese, dated Mar. 27, 2019 with English translation.
Chinese Office Action in Chinese Application No. 201810356492.6 dated Jun. 19, 2019 with English translation.

\* cited by examiner

FLEXIBLE DISPLAY DEVICE AND APPLICATION METHOD THEREOF

CROSS REFERENCE TO RELATED APPLICATIONS

This application is the National Stage of PCT/CN2018/121111 filed on Dec. 14, 2018, which claims priority under 35 U.S.C. § 119 of Chinese Application No. 201810356492.6 filed on Apr. 19, 2018, the disclosure of which is incorporated by reference.

TECHNICAL FIELD

At least one embodiment of the present disclosure relates to a flexible display device and an application method thereof.

BACKGROUND

Flexible display screens are widely used in fields such as portable electronic devices, large-screen electronic devices, and the like, because of their characteristics of being bendable, foldable, or the like. The flexible display screens may be used, for example, in a variety of electronic devices such as mobile communication terminals, tablet computers, electronic books, navigation devices, and the like.

In addition, flexible display screens will have a profound impact on the application of wearable devices due to their characteristics of low power consumption and bendability. In future, the flexible display screens will be widely used with a continuous penetration of personal smart terminals.

SUMMARY

At least one embodiment of the present disclosure provides a flexible display device, the flexible display device comprises a main body and a flexible display screen, the flexible display screen is configured to have a first end coupled to the main body and a second end opposite to the first end of the flexible display screen is movable relative to the main body.

For example, a flexible display device according to at least one embodiment of the present disclosure further comprises a power device, the power device is configured to provide power to the flexible display screen.

For example, in a flexible display device according to at least one embodiment of the present disclosure, the second end of the flexible display screen opposite to the first end of the flexible display screen is configured to be suspended; and an intermediate portion of the flexible display screen between the first end and the second end is configured to be suspended, the intermediate portion and the second end are swingable relative to the main body.

For example, in a flexible display device according to at least one embodiment of the present disclosure, the main body comprises a base portion and a longitudinal support portion; and the flexible display screen is fixed to the longitudinal support portion.

For example, in a flexible display device according to at least one embodiment of the present disclosure, the main body further comprises: a clamping mechanism disposed on the longitudinal support portion; wherein the flexible display screen is fixed to the longitudinal support portion by the clamping mechanism.

For example, in a flexible display device according to at least one embodiment of the present disclosure, a surface of the clamping mechanism for contacting an object to be clamped comprises a cushion.

For example, in a flexible display device according to at least one embodiment of the present disclosure, the longitudinal support portion comprises a first cavity which is hollow, the first cavity comprises an opening, and the clamping mechanism is located at the opening.

For example, a flexible display device according to at least one embodiment of the present disclosure further comprises a driving circuit, which is disposed in the first cavity of the longitudinal support portion and electrically coupled to the flexible display screen to drive the flexible display screen for displaying.

For example, in a flexible display device according to at least one embodiment of the present disclosure, the power device comprises an electric motor, the electric motor is disposed in the first cavity of the longitudinal support portion and configured to drive the clamping mechanism to swing.

For example, in a flexible display device according to at least one embodiment of the present disclosure, the power device further comprises a connecting rod, the connecting rod is disposed in the first cavity of the longitudinal support portion; wherein one end of the connecting rod is connected to the electric motor, and another end of the connecting rod is connected to the clamping mechanism, such that the electric motor drives the connecting rod to rotate to drive the clamping mechanism to swing.

For example, in a flexible display device according to at least one embodiment of the present disclosure, the power device comprises a blower, the blower is disposed on the base portion, and the blower and the base portion are configured to be an integral structure.

For example, in a flexible display device according to at least one embodiment of the present disclosure, the blower further comprises a wind channel, and a blowing direction of the wind channel is adjustable.

For example, a flexible display device according to at least one embodiment of the present disclosure further comprises a control device, the control device is signally coupled to the electric motor and/or the blower to control an operating state of the electric motor and/or the blower.

For example, in a flexible display device according to at least one embodiment of the present disclosure, the flexible display screen has a thickness ranging from 20 microns to 30 microns.

At least one embodiment of the present disclosure provides an application method of the flexible display device, the application method comprises: performing exhibition by using the flexible display device, and the flexible display screen is movable during the exhibition.

For example, in an application method according to at least one embodiment of the present disclosure, the flexible display device further comprises a power device, the power device is configured to provide power to the flexible display screen, and the application method further comprises: enabling the flexible display screen to move under a condition that the flexible display screen accepts a power provided by the power device.

For example, in an application method according to at least one embodiment of the present disclosure, the flexible display screen displays an image during moving.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

DETAILED DESCRIPTION

Figure 1:
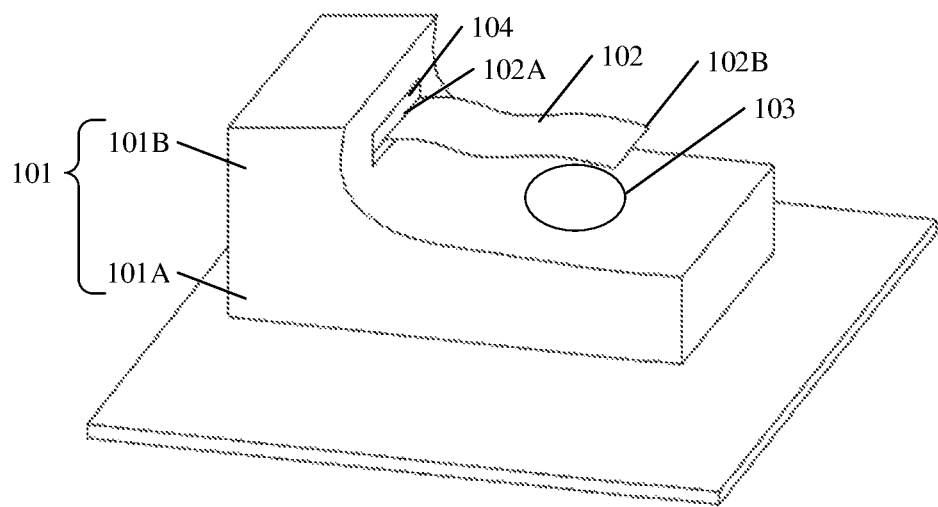
FIG. 1 is a perspective view of a flexible display device according to some embodiments of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art may obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "comprise/comprising," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may comprise an electrical connection/coupling, directly or indirectly. The terms, "on," "under," "left," "right," or the like are only used to indicate relative position relationship, and when the position of the object which is described is changed, the relative position relationship may be changed accordingly.

A current flexible display device generally has only a single form, such as a regular bend state or a spread state. In a case where a display operation is being performed, these single forms cannot bring a vivid visual experience to an audience, which is easy to cause an aesthetic fatigue of the audience.

At least one embodiment of the present disclosure provides a flexible display device, the flexible display device includes a main body and a flexible display screen, a first end of the flexible display screen is coupled to the main body and a second end opposite to the first end of the flexible display screen is movable relative to the main body. For example, a flexible display device according to at least one embodiment of the present disclosure further includes a power device, the power device is configured to provide power to the flexible display screen.

At least one embodiment of the present disclosure provides an application method of the flexible display device, the application method includes performing a exhibition by using a flexible display device, and the flexible display screen is movable during the exhibition. For example, in an application method according to at least one embodiment of the present disclosure, the flexible display device further includes a power device, the power device is configured to provide power to the flexible display screen, and the application method further includes: allowing the flexible display screen to move by accepting a power provided by the power device.

In the above-mentioned flexible display device and application method thereof, the flexible display device has a flexible display screen which is swingable under a drive of a power device, thereby the flexible display screen can perform the displaying during a swinging, such that the flexible display device as a whole has a more beautiful display effect.

Hereinafter, a flexible display device and an application method thereof according to at least one embodiment of the present disclosure will be described with reference to the accompanying drawings.

At least one embodiment of the present disclosure provides a flexible display device, as shown in FIG. 1, the flexible display device includes an main body 101, a flexible display screen 102, and a power device 103. The main body 101 is an entire frame of the flexible display device, which may be used to support or accommodate the flexible display screen 102, the power device 103, and the like, as well as other components. A first end of the flexible display screen 102 (for example, an end 102A of a left side of the flexible display screen 102 shown in FIG. 1) may be coupled to the main body 101, a second end opposite to the first end (for example, an end 102B at a right side of the flexible display screen as shown in FIG. 1) of the flexible display screen is movable relative to the main body 101; and the power device 103 is configured to provide power to the flexible display screen 102 to swing the flexible display screen 102.

For example, in at least one embodiment of the present disclosure, as shown in FIG. 1, the second end of the flexible display screen 102 opposite to the first end is suspended, such that the second end can freely swing under the drive of the power device 103. For example, an intermediate portion between the first end and the second end of the flexible display screen 102 may also be suspended such that the intermediate portion and the second end are swingable relative to the main body 101, such that the flexible display screen 102 as a whole is capable of swinging under the driving of the power device 103. For example, the second end, or the second end and the intermediate portion between the first end and the second end of the flexible display screen 102 is configured to be suspended and not to move in a case where the power device 103 is not activated, and the second end, or the second end and the intermediate portion between the first end and the second end of the flexible display screen 102 swing in a case where the power device 103 is activated and provides sufficient power, therefore the flexible display screen 102 can achieve displaying during swinging.

It should be noted that in a case where a portion of the main body to which the first end is connected (for example, the clamping portion to be described later) is immovable, the flexible display screen being swingable means that the portion of the flexible display screen except that the first end connected to the main body is swingable relative to the main body, but for a case where the portion of the main body to which the first end is connected (for example, the clamping portion) is movable, the whole flexible display screen is swingable.

Illustratively, the "swingable" may be a regular swing, or an irregular swing, for example, fluttering. The swing of the various portions of the flexible display screen may be continuous, for example, each part swings independently without regularity.

For example, in at least one embodiment of the present disclosure, the first end of the flexible display screen 102 may also be, for example, a corner of the flexible display screen 102, correspondingly, the second end of the flexible display screen 102 is another corner opposite to the first end of the flexible display screen 102. For example, in some examples, the flexible display screen 102 may also be in other shapes, such as circular shape, irregular graphics shape, and the like, in this case, the first end of the flexible display screen 102 may be, for example, a portion of the flexible display screen 102 at its edge, and the second end is another portion of the flexible display screen 102 opposite to the first end. At least one embodiment of the present disclosure does not limit the specific form of the first end and the second end of the flexible display screen 102.

Figure 2:
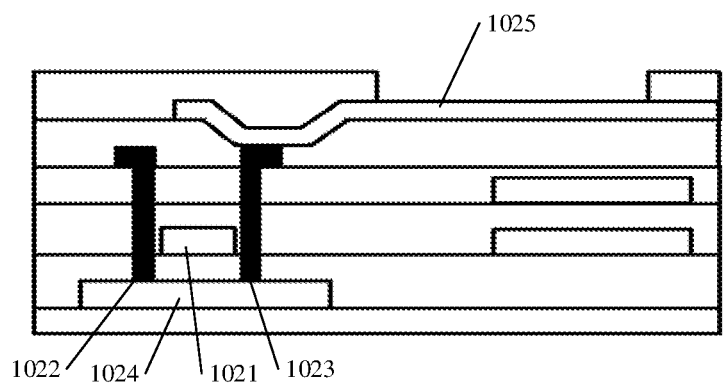
FIG. 2 is a schematic cross-sectional view of a thin film transistor of a flexible display screen according to some embodiments of the present disclosure.

For example, in at least one embodiment of the present disclosure, the flexible display screen 102 may be an organic light emitting diode display panel. The organic light emitting diode display panel may include a plurality of thin film transistors (including, for example, a switching transistor, a driving transistor, and the like), a light emitting structure, an encapsulation layer, and the other functional structures. For example, as shown in FIG. 2, the thin film transistor may include structures such as a gate electrode 1021, a source electrode 1022, a drain electrode 1023, and an active layer 1024, and the like. The light emitting structure includes, for example, a plurality of pixel units each formed corresponding to a thin film transistor.

For example, in at least one embodiment of the present disclosure, the thin film transistor included in the flexible display screen may be a bottom gate type thin film transistor shown in FIG. 2, or the thin film transistor may be a top gate type, a double gate type or other type of thin film transistor.

Figure 3:
FIG. 3 is a schematic cross-sectional view of a light emitting structure of a flexible display screen according to some embodiments of the present disclosure.

For example, each pixel unit of the light emitting structure may include, for example, an organic light emitting diode. As shown in FIG. 3, the organic light emitting diode includes a first electrode 1025, a second electrode 1026, a light emitting layer 1027 disposed between the first electrode 1025 and the second electrode 1026, a hole transport layer 1028, an electron transport layer 1029, and the like. The organic light emitting diode may emit red light, green light, blue light, white light, and the like, which is not limited in this embodiment. In a case where voltages are applied on the first electrode 1025 and the second electrode 1026, electrons and holes are injected into the light emitting layer 1027 to be recombined and excited, such that the light emitting layer 1027 can emit light. For example, the first electrode 1025 of each pixel unit may be connected to the source electrode 1023 or the drain electrode 1024 of the corresponding thin film transistor, thereby it is achieved that the thin film transistor drives and controls the light emitting structure. For example, a case where the first electrode 1025 is electrically connected to the drain electrode 1024 of the corresponding thin film transistor is shown in FIG. 2.

For example, the encapsulation layer may be an inorganic encapsulation layer, an organic encapsulation layer, or a stacked layer of an inorganic encapsulation layer and an organic encapsulation layer. For example, an inorganic material used in the inorganic encapsulation layer may include suitable materials such as silicon nitride, silicon oxide, silicon oxynitride, titanium oxide, zirconium oxide, tantalum oxide, barium titanate, neodymium oxide, aluminum oxynitride, zirconium oxynitride, tantalum oxynitride, yttrium oxynitride, neodymium oxynitride, or the like. The inorganic encapsulating material has excellent water blocking property, and can effectively prevent moisture introduced in the preparation of each functional layer and moisture in the air from penetrating into the flexible display screen. The organic material used for the organic encapsulating layer may be, for example, a suitable material such as polyimide (PI) or epoxy resin. For example, the organic encapsulation layer has a flattening effect to improve a flatness of the flexible display screen. For example, the encapsulation layer may be a stacked layer formed by sandwiching an organic encapsulation layer between two inorganic encapsulation layers, and a water absorbing material may be added to the organic encapsulation layer to enhance an encapsulation effect of the encapsulation layer. At least one embodiment of the present disclosure does not limit the material and specific structure of each functional members of the flexible display screen.

For example, in at least one embodiment of the present disclosure, a thickness of the flexible display screen may range from 20 microns to 30 microns, such as 20 microns, 25 microns, 27 microns, or the like. At this thickness, the flexible display screen 102 can achieve better swinging. For example, at this thickness, a swinging form of the flexible display screen 102 is more natural and artistic.

Illustratively, the flexible display screen may adopt a narrow frame or even an ultra-narrow frame flexible display screen, which can achieve a better display effect. Moreover, an image, such as a dynamic image or a static image, can be displayed while the flexible display screen is swinging. For example, in a case where the flexible display screen displays an image of a flag, a swinging of the display screen can achieve an effect of the flag swinging with a wind, such that a dynamic image display can be realized more realistically.

For example, in at least one embodiment of the present disclosure, as shown in FIG. 1, the main body 101 includes a base portion 101A and a longitudinal support portion 101B, and the flexible display screen 102 may be fixed, for example, on the longitudinal support portion 101B. For example, the flexible display screen 102 may be fixed to the longitudinal support portion 101B in a direction of a plane in which the flexible display screen 102 is located which is parallel to a plane where the base portion 101A is located, which is shown in FIG. 1. For example, the flexible display screen 102 may also be fixed on the longitudinal support portion 101B along a direction in which a certain angel is formed between the plane where the flexible display screen 102 is located and the plane where the base portion 101A is located. For example, the flexible display screen 102 is fixed on the longitudinal support portion 101B at a perpendicular angle between the plane where the flexible display screen 102 is located and the plane where the base portion 101A is located or other suitable angles, which is not limited in at least one embodiment of the present disclosure.

For example, in at least one embodiment of the present disclosure, the main body 101 of the flexible display device may further include a clamping mechanism 104, the clamping mechanism 104 may be disposed, for example, on the longitudinal support portion 101B, and the flexible display screen 102 is fixed to the longitudinal support portion 101B by the clamping mechanism 104. In at least one embodiment of the present disclosure, the clamping mechanism 104 may be, for example, any type of clamp.

For example, in at least one embodiment of the present disclosure, a surface of the clamping mechanism 104 for contacting an object to be clamped, for contacting the flexible display screen 102, includes a cushion. The cushion can prevent the clamping mechanism 104 from exerting excessive force on the flexible display screen 102 in a case where the flexible display screen 102 swings, such that the flexible display screen 102 can be protected. For example, in at least one embodiment of the present disclosure, the cushion may be made of a sponge, a silicone, a foam, or the other cushioning material with the buffering function. At least one embodiment of the present disclosure does not specifically define the material of the cushion.

Figure 4:
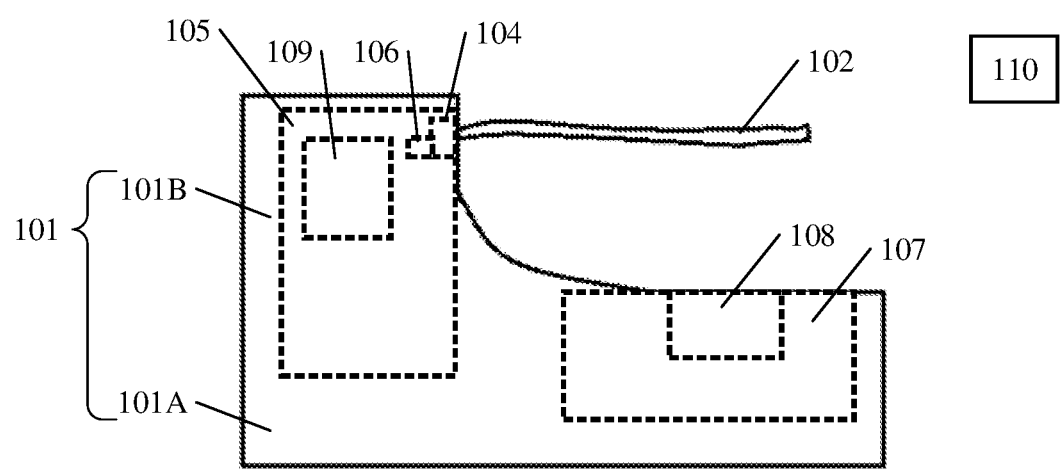
FIG. 4 is a front view of a flexible display device according to some embodiments of the present disclosure.

FIG. 4 is a front view of a flexible display device according to an embodiment of the present disclosure. In at least one embodiment of the present disclosure, the longitudinal support portion 101B has, for example, a first cavity 105 being hollow, for example, the first cavity 105 is located at a position of an outermost dotted frame at a position of the longitudinal support portion 101B in FIG. 4. For example, the first cavity 105 has an opening such that the clamping mechanism 104 may be disposed at the opening position.

For example, in at least one embodiment of the present disclosure, the flexible display device may further include a driving circuit 106. The driving circuit 106 may be disposed, for example, within the first cavity 105 of the longitudinal support portion 101B and electrically coupled to the flexible display screen 102 to drive the display of the flexible display screen 102. For example, a peripheral portion of the flexible display screen 102 may extend into the first cavity 105 through the clamping mechanism 104 to facilitate electrical connection of the driving circuit 106 to the flexible display screen 102. In this case, the first cavity 105 accommodates the driving circuit 106, which can protect the driving circuit 106 without affecting a whole display and style effect of the flexible display device.

For example, in at least one embodiment of the present disclosure, the power device 103 includes a blower. For example, the blower may be disposed on the base portion 101A. A wind generated by the blower may blow to the flexible display screen 102 to provide a swinging power to the flexible display screen 102. For example, in at least one embodiment of the present disclosure, a wind direction, a wind speed, and a duration of the wind generated by the blower may be adjusted, such that the blower may be adjusted as needed to provide different power support for the flexible display screen 102.

For example, in at least one embodiment of the present disclosure, as shown in FIG. 4, the base portion 101A includes a second cavity 107 which is hollow, the blower may be disposed, for example, within the second cavity 107 of the base portion 101A. For example, as shown in FIG. 2, the blower may be disposed at the location of numeral 108.

In at least one embodiment of the present disclosure, for example, the blower and the base portion 101A may be an integral structure. That is, a whole contour of the blower and the base portion 101A may be integrally formed, such that the blower and the base portion 101A may be formed as a whole, which makes the overall design of the flexible display device simpler.

For example, in at least one embodiment of the present disclosure, the blower may include a wind channel. The wind channel may be located, for example, at a position of the blower close to an upper surface of the base portion 101A, a blowing direction of the wind channel is adjustable, thereby the blower can generate driving forces in different directions to the flexible display screen 102, such that the flexible display screen 102 can realize different forms of swinging under the driving of the blower.

For example, in at least one embodiment of the present disclosure, the power device may further include an electric motor. The electric motor may be disposed, for example, within the first cavity 105 of the longitudinal support portion 101B and configured to drive the clamping mechanism 104 to swing, thereby driving the flexible display screen 102 to swing. For example, in FIG. 4, the electric motor is disposed within a dotted frame denoted by reference numeral 109.

For example, in at least one embodiment of the present disclosure, the power device may further include a connecting rod. The connecting rod is disposed in the first cavity 105 of the longitudinal support portion 101B, one end of the connecting rod may be connected to the electric motor, and another end of the connecting rod is connected to the clamping mechanism 104, such that the electric motor drives the connecting rod to rotate and drives the clamping mechanism 104 to swing. In this case, the flexible display screen 102 may also swing under a swinging of the clamping mechanism 104.

For example, a swing frequency and a swing amplitude of the clamping mechanism 104 may be adjusted by adjusting a rotational frequency of the electric motor and a rotational amplitude of driving the connecting rod of the electric motor, such that a swing state of the flexible display screen 102 also changes.

It should be noted that in at least one embodiment of the present disclosure, the power device may include only one or a combination of a blower and an electric motor to adjust the swing state of the flexible display screen at different angles. In addition, the power device may be an independent device, for example, the power device may be a separate blower or electric motor and may be placed outside the main body as long as the power device can provide power to the flexible display screen.

For example, in at least one embodiment of the present disclosure, the flexible display device may further include a control device 110, the control device 110 may be signally coupled to an electric motor and/or a blower to control an operating state of the electric motor and/or the blower. For example, the control device 110 may be, for example, a personal computer (PC), a single chip microcomputer, a programmable logic controller (PLC), and other various types of control devices, which is not limited in at least one embodiment of the present disclosure.

In at least one embodiment of the present disclosure, the main body 101 may include, for example, a metal material or an acrylic material. The clamping mechanism may be made of, for example, acrylic or other resin materials. At least one embodiment of the present disclosure does not limit the material and specific shape of each functional structure of the flexible display device.

The flexible display device provided by at least one embodiment of the present disclosure has a flexible display screen which is swingable under a driving of the power device, thereby a display can be performed in the swing, such that the flexible display device has a more beautiful display effect as a whole, and can be used in various fields such as scene exhibition.

At least one embodiment of the present disclosure provides an application method of the flexible display device, the application method includes: performing an exhibition by using a flexible display device, and the flexible display screen is movable during the exhibition. For example, the flexible display device also includes a power device configured to provide power to the flexible display screen, the flexible display screen is moved by accepting a power provided by the power device.

For example, in at least one embodiment of the present disclosure, the flexible display screen displays an image while moving. The image may be, for example, a static image or a dynamic image.

For example, in one example, a flexible display device may be placed in a certain scene and the flexible display screen is configured to display an image that matches the scene. For example, in a case where the flexible display device is in a sky or blue scene, the flexible display screen may be configured to display an image of white clouds floating in the blue sky. For example, in a case where the flexible display device is in a grassland scene or a green scene, the flexible display screen may be configured to display an image of the grass swinging in a lawn. For example, in some indoor or outdoor scenes, the flexible display screen may be configured to display an image of the flag floating with the wind. In this case, the flexible display screen may be disposed, for example, at an angle in which the flexible display screen is located is perpendicular to a horizontal plane, and the two flexible display screens may be attached together to realize a double-sided display of the flexible display screen.

For example, in another example, a flexible display device may also be used for advertising displays. For example, a flexible display screen is used to display some advertising information in a swing to attract attentions of viewers.

For example, the flexible display device may also be used to demonstrate the characteristics of the flexible display screen itself. For example, the thickness and flexibility of flexible display screen are important indicators for evaluating the flexible display screen. In a case where the flexible display screen of the flexible display device performs displaying at the same time of swinging, a swing shape of the flexible display screen can exhibit the thickness and flexibility of the flexible display screen to a certain extent, such that the excellent characteristics of the flexible display screen can be reflected.

For the present disclosure, the following points should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined to obtain new embodiments.

The foregoing are merely specific embodiments of the invention, but not limitative to the protection scope of the invention. Within the technical scope disclosed by the present disclosure, any alternations or replacements which can be readily envisaged by one skilled in the art shall be within the protection scope of the present disclosure. Therefore, the protection scope of the invention shall be defined by the accompanying claims.

What is claimed is:

1. A flexible display device, comprising:
   a main body; and
   a flexible display screen, configured to have a first end coupled to the main body,
   wherein a second end of the flexible display screen opposite to the first end is movable relative to the main body,
   wherein the main body comprises a base portion and a longitudinal support portion,
   the flexible display screen is fixed to the longitudinal support portion,
   wherein the main body further comprises:
   a clamping mechanism, disposed on the longitudinal support portion;
   wherein the flexible display screen is fixed to the longitudinal support portion by the clamping mechanism,
   wherein a surface of the clamping mechanism for contacting an object to be clamped comprises a cushion.

2. The flexible display device according to claim 1, further comprising:
   a power device, configured to provide power to the flexible display screen.

3. The flexible display device according to claim 2, wherein,
   the second end of the flexible display screen opposite to the first end of the flexible display screen is configured to be suspended; and
   an intermediate portion of the flexible display screen between the first end and the second end is configured to be suspended, the intermediate portion and the second end are swingable relative to the main body.

4. The flexible display device according to claim 1, wherein the longitudinal support portion comprises a first cavity which is hollow, the first cavity comprises an opening, and the clamping mechanism is located at the opening.

5. The flexible display device according to claim 4, further comprising:
   a driving circuit, disposed in the first cavity of the longitudinal support portion and electrically coupled to the flexible display screen to drive the flexible display screen for displaying.

6. The flexible display device according to claim 4, wherein the power device comprises:
   an electric motor, disposed in the first cavity of the longitudinal support portion and configured to drive the clamping mechanism to swing.

7. The flexible display device of claim 6, wherein the power device further comprises:
   a connecting rod, disposed in the first cavity of the longitudinal support portion;
   wherein one end of the connecting rod is connected to the electric motor, and another end of the connecting rod is connected to the clamping mechanism, such that the electric motor drives the connecting rod to rotate to drive the clamping mechanism to swing.

8. The flexible display device according to claim 1, wherein,
   the power device comprises a blower, the blower is disposed on the base portion, and the blower and the base portion are configured to be an integral structure.

9. The flexible display device according to claim 8, wherein the blower further comprises a wind channel, and a blowing direction of the wind channel is adjustable.

10. The flexible display device according to claim 8, further comprising:
    a control device, signally coupled to the blower to control an operating state of the blower.

11. The flexible display device according to claim 1, wherein the flexible display screen has a thickness ranging from 20 microns to 30 microns.

12. An application method of the flexible display device according to claim 1, comprising:
performing exhibition by using the flexible display device,
wherein the flexible display screen is movable during the exhibition.

13. The application method according to claim 12, wherein the flexible display device further comprises a power device, the power device is configured to provide power to the flexible display screen, and the application method further comprises:
enabling the flexible display screen to move under a condition that the flexible display screen accepts a power provided by the power device.

14. The application method according to claim 12, wherein the flexible display screen displays an image during moving.

15. The application method according to claim 13, wherein the flexible display screen displays an image during moving.

16. A flexible display device, comprising:
a main body;
a flexible display screen, configured to have a first end coupled to the main body; and
a power device, configured to provide power to the flexible display screen
wherein a second end of the flexible display screen opposite to the first end is movable relative to the main body,
wherein the main body comprises a base portion and a longitudinal support portion, and the flexible display screen is fixed to the longitudinal support portion,
wherein the main body further comprises: a clamping mechanism, disposed on the longitudinal support portion,
wherein the flexible display screen is fixed to the longitudinal support portion by the clamping mechanism,
wherein the longitudinal support portion comprises a first cavity which is hollow, the first cavity comprises an opening, and the clamping mechanism is located at the opening,
wherein the power device comprises: an electric motor, disposed in the first cavity of the longitudinal support portion and configured to drive the clamping mechanism to swing.

17. The flexible display device of claim 16, wherein the power device further comprises:
a connecting rod, disposed in the first cavity of the longitudinal support portion;
wherein one end of the connecting rod is connected to the electric motor, and another end of the connecting rod is connected to the clamping mechanism, such that the electric motor drives the connecting rod to rotate to drive the clamping mechanism to swing.

18. A flexible display device, comprising:
a main body;
a flexible display screen, configured to have a first end coupled to the main body; and
a power device, configured to provide power to the flexible display screen
wherein a second end of the flexible display screen opposite to the first end is movable relative to the main body,
wherein the main body comprises a base portion and a longitudinal support portion, and the flexible display screen is fixed to the longitudinal support portion,
wherein the power device comprises a blower, the blower is disposed on the base portion, and the blower and the base portion are configured to be an integral structure.

19. The flexible display device of claim 18, wherein the blower further comprises a wind channel, and a blowing direction of the wind channel is adjustable.

20. The flexible display device of claim 18, further comprising:
a control device, signally coupled to the blower to control an operating state of the blower.

* * * * *